United States Patent Office 3,547,833
Patented Dec. 15, 1970

3,547,833
PREPARATION OF CATALYST CARRIER
Tomosaburo Yano, Tadasi Matuo, Hideo Ichinokawa, Masatomo Ito, and Koichi Kuno, Tokyo, Japan, assignors to Showa Denko Kabushiki Kaisha, Tokyo, Japan, a corporation of Japan
No Drawing. Filed July 24, 1967, Ser. No. 655,305
Claims priority, application Japan, Oct. 21, 1966, 41/68,882
Int. Cl. B01j *11/06*
U.S. Cl. 252—463                          3 Claims

ABSTRACT OF THE DISCLOSURE

Process for preparing a catalyst carrier which consists of sintering a homogeneous mixture of titania powder and aluminum powder in an oxidizing atmosphere at a temperature range 650°–950° C., and the use of said carrier as a catalyst support in the vapor phase oxidative reaction of hydrocarbons.

---

This invention relates to a process for preparing a catalyst carrier which uses as its substrate titania, the characteristic feature being that the catalyst carrier is obtained by mixing titania powder and aluminum powder homogeneously and thereafter calcining the mixture to effect its sintering. The invention also relates to the use of the so prepared catalyst carrier as a catalyst support in the vapor phase oxidative reaction of hydrocarbons.

It has long been known that titania experimentally shows certain specific characteristics; namely, that it abounds in oxygen adsorbability, that its activity is great even at a lower temperature and that it does not set up side reactions. However, it has not been applied to actual commercial use. This is due to the fact that since a molding technique had not been established for titania which is produced in powder form, shaped objects thereof which could withstand commercial use could not be obtained.

A strong cohesion does not occur in the case of titania, which is produced as a powder, even when it is attempted to mold it with compression. Even though the molding is accomplished by employing a very great pressure, say, of one ton per square centimeter, the brittleness of the resulting shaped object is such that its compression strength is not even one kilogram per square centimeter. Hence, this product which has been molded with a high pressure must be sintered at an elevated temperature. Although a strong shaped object can be obtained by sintering this product at above 1000° C., the volume percent porosity and surface area of the product so obtained is small, and hence it is not effective for use as a catalyst carrier.

This being the case, the practice heretofore has been to mix with the titania powder various metal oxides as the sintering accelerator following by sintering such a mixture. As the sintering accelerator, such oxides, for example, as zirconia, magnesia, silica, alumina, calcium oxide, barium oxide and strontium oxide are used. The action of these metal oxides in accelerating the sintering of titania is however not of an extent as to be fully satisfactory. The use of these metal oxides in a considerably great quantity is required, or else it is not effective. In addition, a strong sintered mass cannot be obtained at temperatures below 1000° C. On the other hand, when the calcination is carried out at an elevated temperature exceeding 1000° C. for imparting strength, the volume percent porosity and the surface area of the resulting sintered mass declines abruptly to result in a product which is highly unsatisfactory for use as a catalyst carrier.

We have found that when aluminum powder is mixed homogeneously with titania powder, and then this mixture is sintered, the aluminum, becoming oxidized, would then demonstrate a very remarkable action of accelerating the sintering operation, with the consequence that a strong sintered mass possessing the various highly desirable properties as required by a catalyst carrier could be obtained. Further, it was found that the shape desired could be very readily imparted to the foregoing mixture by the usual molding methods. Even when sintering is carried out on the mixture which is premolded to a desired shape, strong catalyst carriers can likewise be obtained.

The aluminum powder manifests satisfactory sintering action with a lesser equivalent than the conventional metal oxide sintering accelerators, e.g. alumina, and moreover forms strong sintered masses. In other words, the substrate titania is not diluted to a large extent with the other components, and hence a good grade sintered mass can be obtained.

Further, when aluminum powder is used, a strong sintered mass can be obtained at low temperatures, such as about 650° to 950° C. When compared with the fact that in the case where the conventional metal oxides were used the temperature in all cases had to be above 1000° C., or else satisfactory sintering could not be accomplished, it can be seen that the action of aluminum powder in accelerating the sintering is very unique.

The mechanism resulting from the use of aluminum powder, as hereinabove described, which brings about such effects as imparting moldability to the titania powder, acceleration of the sintering and imparting of the hereinabove noted characteristics to the sintered mass, is not fully known as yet, but it is believed that certain characteristics of aluminum powder are involved. Namely, aluminum powder excels in its adhesion to the surface of titania particles as well as in its penetrability to the space between the titania particles. Its lubricity contributes to the maintenance of uniformity in the pressure distribution during compression molding. Aluminum powder possesses high chemical activity and is readily oxidized by heating in an oxidizing atmosphere. The resulting aluminum oxide also has great activity and, in addition, possesses a strong cohesive force. Another characteristic is that aluminum, upon being oxidized, increases its volume to result in the elaboration of the shaped object as well as restraining of its shrinkage during sintering.

The sintered mass obtained according to the invention process by the application of a calcination temperature of less than about 950° C. is much more superior to any of the catalyst carriers that have been known in the past, and especially when used as a catalyst carrier in the vapor phase oxidative reaction of hydrocarbons.

The vapor phase oxidation of hydrocarbons whereby the manufacture of useful compounds by the partial oxidation procedure using molecular oxygen is generally carried out, has been practiced heretofore commercially in such processes, for example, as the manufacture of maleic anhydride by the oxidation of butene or benzene with oxygen, phthalic anhydride by the oxidation of naphthalene or ortho-xylene with air, cyanobenzenes by the ammoxidation of xylenes, ethylene oxide by the direct oxidation of ethylene, and acrolein by the oxidation of propylene with oxygen. Most of these vapor phase oxidation reactions are carried out in the presence of a catalyst which is used in a mode wherein the catalyst is supported on a carrier. The properties required of a carrier are that it possesses mechanical strength, resistance to chemicals and high heat resistance. In addition, it must possess a surface area and volume percent porosity of such a magnitude as will be sufficient to meet the requirements of the class of reaction which it is to catalyze.

Those being actually used at present include pumice, silica gel, alundum, aluminum sponge and others, but none are available which completely satisfy the hereinabove noted requirements. They have the drawbacks that their surface area and pore volume are not sufficiently great, they crumble and become powdery during use, the catalyst component falls off due to lack of their adhering and retaining force, or as in the case with aluminum sponge semimelting of the carrier takes place to become the cause of a decline in activity.

On the other hand, it becomes possible according to this invention to obtain readily from titania powder a catalyst carrier of not only the desired dimensions but also of any form such as cylindrical, spherical, etc., as required. This catalyst carrier is ideal in that it not only excels in its mechanical strength but also has a large surface area and pore volume, and further, as illustrated in the hereinafter given examples, it demonstrates good results in the various oxidative reactions.

It is therefore an object of this invention to provide a process for preparing a catalyst carrier possessing outstanding properties, which is prepared using titania as the substrate. Another object resides in the use of such a carrier as a catalyst support in the vapor phase oxidative reaction of hydrocarbons.

The process of preparing a catalyst carrier according to this invention comprises calcining at a temperature ranging between 650° and 950° C. in an oxidizing atmosphere a homogeneous mixture comprising a major amount of titania powder and a minor amount of aluminum powder to effect the sintering of said mixture. This invention is also directed to the use of the so obtained carrier as a catalyst support in the vapor phase oxidative reaction of hydrocarbons.

This invention will be more fully described hereinafter. The titania powder and aluminum powder used are in both cases those which are produced in a customary manner and are commercially available, these powders being used in their as-obtained state. Titania is usually produced as a powder having an average particle diameter of less than about 10 microns, and its predominant constituent is titanium dioxide. Minute particles of a size on the order of 0.1–1 micron can be used in this invention. On the other hand, relatively large particles on the order of 10–180 microns can also be used. Aluminum powder which is readily available commercially is generally of relatively large size being on the order of 50–150 microns but, of course, those of smaller size can also be used. As finely divided aluminum is in most cases sold in a granular form, it is preferred that it be ground when using. The aluminum powder to be added and mixed with titania is effective in a very small amount. And a tendency to an increase in the strength of the final shaped object is noted as the amount added of the aluminum powder is increased. Roughly, the point where no further increase in strength occurs is reached when the amount added of the aluminum powder is about the same as the amount of titania. Again, an increase beyond that point results in the quantitative dilution of the titania substrate. The proportion by weight in which the titania and aluminum are present in the homogeneous mixture should be such that the former occupies a major part with the latter being present in a minor part. Due perhaps to the fact that the particles of aluminum powder are usually larger than those of titania, the presence in large amounts of aluminum powder brings about a decrease in the surface area of the sintered mass. Further, it is also an advantage to use the aluminum powder in smaller amounts since it is more costly than titania. Accordingly, the preferred weight ratio of the titania to the aluminum is 99—more than 50 to 1—less than 50, that is, the titania is present in from about 99 to about 50 parts by weight and the aluminum is present in from about 1 to about 50 parts by weight. A particularly convenient range, when considered from the standpoint of obtaining a homogeneous mixture and ease of molding when the molding is to be carried out in advance, is 97–80:3–20.

As hereinbefore noted, the mixture containing the titania powder and aluminum powder can be either sintered directly or can be sintered after first molding it into a desired form such as a spherical or cylindrical form, under the hereinafter noted conditions. The mass obtained by directly sintering the homogeneous mixture is ground and screened as required to obtain particles of a desired range of particle size. Since as a catalyst carrier it is desirable in most cases that it possesses uniform particle, in this case it is best to carry out the sintering operation after the mixture has been first molded. When the mixture is to be first molded, it is convenient to use water or the known temporary binders such, for example, as stearic acid or an aqueous solution of starch, sugar or carboxymethylcellulose. Since the generally commercially available aluminum powder usually already contains stearic acid as an antioxidant, this can be used as-obtained.

The molding can be accomplished by means of a granulator, tablet machine, extruder, compression molder, or any other form-imparting means in accordance with the form desired. For example, the mixture of titania and aluminum powder is kneaded with a suitable amount of water and made into granules 0.5–1 mm. in diameter by means of a granulator equipped with a screw feeder and a stainless steel screen. After the granules have been dried for about 3 hours at a temperature on the order of 60° C. to reduce their water content to 5 wt. percent, they are formed into tablets 5 mm. in diameter and 5 mm. thick by means of a tablet machine.

The shaped object, after being dried as required, is calcined to effect its sintering. The calcination is carried out in a customary manner employing an electric or gas furnace or the like, in an oxidizing atmosphere, an atmosphere of air being, of course, satisfactory. For shortening the calcination time, a calcination temperature usually of above about 650° C. is employed, the upper limit being 950° C. At a temperature close to or exceeding 1000° C. the surface area and pore volume of the resulting sintered mass decreases and hence its properties as a catalyst carrier suffer. On the other hand, at below 800° C., the maximum strength is not achieved at times even though the calcination is carried out over a relatively prolonged period of time. For obtaining the best performance as a catalyst carrier (i.e. activity when it is made to support a catalyst), the calcination is favorably carried out at a relatively low temperature. Hence, in consideration of the balance between performance and mechanical strength, a temperature ranging between 800° and 900° C. is the optimum. The aluminum thus becomes oxidized and converted to aluminum oxide to thereby bind the titania particles firmly.

Generally speaking, there is a relation between the pore volume and strength of the sintered mass and the calcination temperature and time. Namely, a direct correlation exists between the strength of the sintered mass and both the temperature and time of calcination, whereas an inverse correlation exists between these and the pore volume of the sintered mass. The temperature and time are suitably chosen in accordance with the strength and pore volume desired, but usually a calcination time of one to several hours is chosen. Usually, about two hours is sufficient but, at times, 3–5 hours are required.

The sintered mass obtained, as hereinbefore described, from titania powder and aluminum powder has not only a very great compression strength but also a great surface area and pore volume and, as a consequence, it is suitable for use as a catalyst carrier, and especially a catalyst carrier for use in the vapor phase oxidation of hydrocarbons.

The following nonlimiting examples are given for illustrating this invention. The surface area of the sintered mass, as indicated in the examples, is a value measured by the B.E.T. method using $N_2$ gas. As to the pore volume, for the sake of simplicity, the rate of water absorption was measured. Since there exists pores which are so small as will not permit the entry of water, the total pore volume is a value somewhat greater than the rate of water absorption measured, but the two are roughly proportionate. The rate of water absorption is a value obtained by boiling 10 grams of the specimen in water for one hour followed by swiching off the water, weighing the specimen and expressing the weight increase as a percentage.

EXAMPLE 1

After adding 3 parts by weight of aluminum powder to 97 parts by weight of titania powder, mixing of the two was carried out for one hour using an agitating grinder. A small amount of water was added to the mixture to impart fluidity to it, following which it was placed in an extruder and extruded in strand form from a nozzle 3 mm. in diameter. After drying the strand for 2 hours at 100° C., it was cut in pellets 3 mm. in length. These pellets were heated and calcined in an electric furnace for 2 hours in air at 850° C. The resulting sintered mass had the following property values. Surface area 7.5 $m^2/g.$, water absorption 38%, compression strength 150 kg./cm.$^2$

EXAMPLE 2

Nine parts by weight of aluminum powder were added to 91 parts of titania powder, after which the mixing of the two ingredients was accomplished as in Example 1. After adding a small amount of water to impart cohesiveness to the mixture, it was formed into spherical particles 5 mm. in diameter using a granulator. These particles were calcined by heating for 3 hours in an electric furnace maintained at 800° C.

The resulting sintered product had a surface area of 6.8 $m^2/g.$, a water absorption of 35% and a compression strength of 200 kg./cm.$^2$.

EXAMPLE 3

A mixture of 50 parts by weight of titania powder and 50 parts by weight of aluminum powder was kneaded together with a small quantity of an aqueous solution of carboxymethylcellulose and then calcined for 5 hours at 750° C. The resulting sintered mass was crushed and portions which pass a 5–15 mesh were recovered by screening. The surface area of these particles was 3.8 $m^2/g.$ and the water absorption rate was 32%.

Comparison 1

A homogeneous mixture of 75 parts by weight of titania and 25 parts by weight of alumina was formed into tablets 5 mm. in diameter and 5 mm. high, using a tablet machine. The compression strength, surface area and water absorption of these tablets after heat treating for 2 hours at the several temperatures indicated are shown below.

| | Heat treatment temperature, °C. | Compression strength, kg./cm.$^2$ | Surface area, m.$^2$/g. | Water absorption, percent |
|---|---|---|---|---|
| (a) | 750 | 3 | 8.5 | 38 |
| (b) | 900 | 15 | 8.0 | 38 |
| (c) | 1,000 | 55 | 4.3 | 30 |
| (d) | 1,100 | 83 | 2.5 | 22 |
| (e) | 1,200 | 110 | 1.0 | 16 |

As apparent from the foregoing results the compression strength of shaped objects obtained by heat treatment at below 1000° C. in the case where alumina had been used was very small. On the other hand, when treatment at elevated temperatures exceeding 1000° C. was carried out, the surface area and the rate of water absorption declined abruptly. Its strength was also not such as to be fully satisfactory.

EXAMPLE 4

A vanadium oxide-molybdenum oxide catalyst using as carrier the sintered products obtained by Examples 1–3 was employed and the vapor phase oxidation of benzene was carried out.

The catalyst was prepared in customary manner. The contents of vanadium oxide and molybdenum oxide were 11.6% and 4.2% by weight, respectively.

The foregoing catalyst was packed in a reactor 1000 mm. long and having an inside diameter of 25 mm., which was maintained at 400° C. by means of a molten salt bath. The yield of maleic anhydride obtained when air containing 0.5% by volume of benzene was contacted with the foregoing catalyst at a rate of contact time of one second is shown in Table I.

By way of comparison, results obtained when the reaction was carried out in similar manner, except that as the carrier was used one prepared by sintering titania to which had been added alumina (according to Comparison 1–e) or one comprising either pumice, silica gel or fused alumina are also shown.

TABLE I

| | Maleic anhydride yield, mol percent | Carbon dioxide yield, mol percent |
|---|---|---|
| Carrier: | | |
| Example 1 | 68 | 20 |
| Example 2 | 69 | 17 |
| Example 3 | 60 | 25 |
| Comparison 1–e | 45 | 23 |
| Pumice | 43 | 35 |
| Silica gel | 16 | 54 |
| Fused alumina | 38 | 22 |

As is apparent from the results given in Table I, the titania carrier according to this invention provides the intended maleic anhydride in good yield. On the other hand, the titania carrier sintered using alumina does not provide such a good yield. Again, in the case of the customarily used pumice and silica gel carriers, the perfect combustion of the benzene is promoted, with the consequence that the yield of maleic anhydride is low. Further, since the production of reaction heat becomes very great in this case, the operation of the reaction becomes difficult. When the fused alumina carrier is used, the catalytic activity is low, and with reaction conditions of this sort unreacted benzene is still present.

EXAMPLE 5

Using as the carrier the molded sintered products obtained in Examples 1–3, a vanadium oxide-potassium sulfate catalyst was prepared. The vapor phase oxidation of ortho-xylene was carried out using this catalyst.

The catalyst was prepared by impregnating the foregoing carrier with an aqueous vanadyl sulfate solution and an aqueous potassium sulfate solution, after which the impregnated carrier was calcined for 10 hours at 400° C. while introducing air.

This catalyst contained 5–3% by weight of vanadium oxide and 5% by weight of potassium sulfate.

When the reactor described in Example 4 was used and air containing 0.5% of ortho-xylene was passed in contact with the catalyst maintained at 350° C. at a rate of contact time of one second, reaction results as shown in Table II were obtained. By way of comparison, also shown are results obtained when the carrier used was one obtained by sintering titania to which alumina had been added (according to Comparison 1–e) or one comprising either pumice, silica gel, diatomaceous earth or fused alumina.

TABLE II

| Carrier | Maleic anhydride yield, mol percent | Carbon dioxide yield, mol percent |
|---|---|---|
| Example 1 | 72 | 20 |
| Example 2 | 73 | 16 |
| Example 3 | 65 | 25 |
| Comparison 1-e | 62 | 32 |
| Silica gel | 35 | 65 |
| Diatomaceous earth | 27 | 63 |
| Fused alumina | 60 | 31 |

EXAMPLE 6

A catalyst for use in the ammoxidation of metaxylene was prepared using as the carrier the molded sintered product obtained in Examples 1–3. A vanadyl oxalate solution was prepared from vanadium oxide and oxalic acid in customary manner. This was poured over the foregoing carriers followed by evaporation and drying at 100° C. The resulting solid product was then calcined for 8 hours in air at 400° C. to effect the conversion of vanadyl oxalate to vanadium oxide. This catalyst contained 10% by weight of vanadium oxide. Employing the reactor described in Example 4, a mixture of ammonia and air containing 1.5% by volume of metaxylene was contacted with the catalyst.

In Table III are shown the reaction conditions and results obtained, along with those instances where as the carrier had been used one obtained by sintering titania to which had been added alumina (according to Comparison 1-e) and those comprising diatomaceous earth, silica gel and fused alumina.

TABLE III

| Carrier | Contact time, sec. | Reaction temperature, °C. | NH₃/xylene, mol ratio | Yield of isophthalonitrile to xylene, mol percent |
|---|---|---|---|---|
| Example 1 | 3 | 370 | 6 | 79 |
|  | 1 | 395 | 6 | 76 |
| Example 2 | 3 | 370 | 6 | 78 |
|  | 2 | 380 | 6 | 78 |
|  | 1 | 400 | 6 | 77 |
| Example 3 | 3 | 375 | 5 | 72 |
|  | 1 | 400 | 5 | 70 |
| Comparison 1-e | 6 | 430 | 8 | 45 |
|  | 3 | 440 | 8 | 48 |
| Silica gel | 3 | 380 | 8 | 38 |
|  | 2 | 400 | 8 | 33 |
| Diatomaceous earth | 4 | 400 | 6 | 43 |
|  | 2 | 410 | 6 | 40 |
| Fused alumina | 6 | 420 | 8 | 63 |
|  | 4 | 430 | 6 | 65 |
|  | 3 | 450 | 6 | 60 |

EXAMPLE 7

Example 5 was repeated except that instead of ortho-xylene air containing 1.5% by volume of para-xylene and 12% by volume of ammonia was used, with the results shown in Table IV. The reaction temperature was 370° C.

TABLE IV

| Carrier: | Contact time, sec. | Terephthalonitrile yield, mol percent |
|---|---|---|
| Example 1 | 6 | 80 |
|  | 3 | 79 |
| Example 2 | 6 | 80 |
|  | 3 | 81 |
| Example 3 | 6 | 74 |
|  | 3 | 73 |
| Comparison 1-e | 4 | 28 |
|  | 6 | 32 |
| Silica gel | 3 | 45 |
| Diatomaceous earth | 6 | 26 |
| Fused alumina | 6 | 12 |

We claim:

1. A process for preparing a catalyst carrier which comprises calcining a homogeneous mixture comprising a major amount of titania powder and a minor amount of aluminum powder, in an oxidizing atmosphere at a calcination temperature ranging between 650° and 950° C. to effect the sintering of said mixture, the ratio by weight of titania:aluminum being from about 97 to about 80: from about 3 to about 20.

2. The process according to claim 1 wherein the calcination temperature is 800–900° C.

3. A process for preparing a catalyst carrier which comprises calcining a homogeneous mixture comprising from about 99 to about 50 parts by weight of titania powder and from about 1 to about 50 parts by weight of aluminum powder, in an oxidizing atmosphere at a calcination temperature ranging between 650° and 950° C. to effect the sintering of said mixture, said homogeneous mixture containing a temporary binder.

References Cited

UNITED STATES PATENTS

| 3,166,545 | 1/1965 | Pezdirtz | 260—94.8 |
| 2,848,324 | 8/1958 | Keapf | 75—206 |
| 3,311,464 | 3/1967 | Blomberg | 75—.5 |
| 3,219,466 | 11/1965 | Isherwood | 106—58 |
| 2,741,822 | 4/1956 | Udy | 25—157 |
| 3,014,020 | 12/1961 | Balthis | 260—94.9 |
| 2,976,299 | 3/1961 | Manly | 260—345.1 |
| 2,873,198 | 2/1959 | Goliber | 106—65 |

DANIEL E. WYMAN, Primary Examiner

P. M. FRENCH, Assistant Examiner